United States Patent
Greulich-Weber

(10) Patent No.: US 10,926,291 B2
(45) Date of Patent: Feb. 23, 2021

(54) PROCESS FOR PRODUCING A SILICON CARBIDE-CONTAINING BODY

(71) Applicant: Universität Paderborn, Paderborn (DE)

(72) Inventor: Siegmund Greulich-Weber, Bad Lippspringe (DE)

(73) Assignee: Universität Paderborn, Paderborn (DE)

( * ) Notice: Subject to any disclaimer, the term of this patent is extended or adjusted under 35 U.S.C. 154(b) by 296 days.

(21) Appl. No.: 15/563,189

(22) PCT Filed: Mar. 31, 2016

(86) PCT No.: PCT/EP2016/057000
§ 371 (c)(1),
(2) Date: Sep. 29, 2017

(87) PCT Pub. No.: WO2016/156453
PCT Pub. Date: Oct. 6, 2016

(65) Prior Publication Data
US 2018/0193877 A1    Jul. 12, 2018

(30) Foreign Application Priority Data

Apr. 1, 2015  (DE) .................. 10 2015 105 085.4

(51) Int. Cl.
*B05D 3/06* (2006.01)
*C04B 35/571* (2006.01)
(Continued)

(52) U.S. Cl.
CPC .......... *B05D 3/06* (2013.01); *B05D 3/0254* (2013.01); *B28B 1/001* (2013.01); *C04B 35/565* (2013.01);
(Continued)

(58) Field of Classification Search
CPC ..... B05D 3/0254; B28B 1/001; C04B 35/565; C04B 35/571; C04B 35/624; C04B 35/6262
(Continued)

(56) References Cited

U.S. PATENT DOCUMENTS 5,156,697 A * 10/1992 Bourell .................. B23K 26/34
                                                      264/497
5,431,967 A *  7/1995 Manthiram ............. B22F 3/004
                                                      427/555
(Continued)

FOREIGN PATENT DOCUMENTS

CN      102528034      *  4/2012 ............ Y02P 10/295
EP     0294850 A1     * 12/1988 ........... C04B 35/632
(Continued)

OTHER PUBLICATIONS

Video, 3DSystems Selective Laser Sintering Process, Jun. 23, 2013, See Video Time Stamp, URL:https://www.youtube.com/watch?v=6s09pfILV8Y (Year: 2013).*

(Continued)

*Primary Examiner* — Alison L Hindenlang
*Assistant Examiner* — Andrés E. Behrens, Jr.
(74) *Attorney, Agent, or Firm* — Reising Ethington, P.C.

(57) ABSTRACT

The present invention relates to a process for producing a silicon carbide-containing body (100), characterized in that the process has the following process steps: a) providing a mixture (16) comprising a silicon source and a carbon source, the silicon source and the carbon source being present together in particles of a solid granular material; b) arranging a layer of the mixture (16) provided in process step a) on a carrier (12), the layer of the mixture (16) having a predefined thickness; and c) treating the mixture (16) arranged in process step b) over a locally limited area with (Continued)

Figure 1:
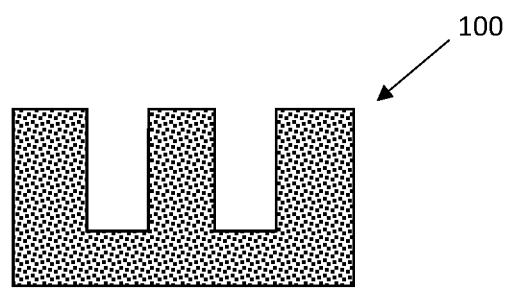

a temperature within a range from ≥1400° C. to ≤2000° C. according to a predetermined three-dimensional pattern, the predetermined three-dimensional pattern being selected on the basis of the three-dimensional configuration of the body (100) to be produced. Such a process allows simple and inexpensive production even of complex structures from silicon carbide.

18 Claims, 8 Drawing Sheets

(51) Int. Cl.
    *C04B 35/624* (2006.01)
    *C04B 35/565* (2006.01)
    *C04B 35/63* (2006.01)
    *C04B 35/64* (2006.01)
    *B28B 1/00* (2006.01)
    *B05D 3/02* (2006.01)
    *C04B 35/626* (2006.01)
    *C04B 35/80* (2006.01)

(52) U.S. Cl.
CPC .......... *C04B 35/571* (2013.01); *C04B 35/624* (2013.01); *C04B 35/6262* (2013.01); *C04B 35/62655* (2013.01); *C04B 35/62695* (2013.01); *C04B 35/63* (2013.01); *C04B 35/64* (2013.01); *C04B 35/806* (2013.01); *C04B 2235/422* (2013.01); *C04B 2235/443* (2013.01); *C04B 2235/447* (2013.01); *C04B 2235/46* (2013.01); *C04B 2235/465* (2013.01); *C04B 2235/48* (2013.01); *C04B 2235/5244* (2013.01); *C04B 2235/5264* (2013.01); *C04B 2235/5436* (2013.01); *C04B 2235/606* (2013.01); *C04B 2235/6026* (2013.01); *C04B 2235/656* (2013.01); *C04B 2235/665* (2013.01)

(58) Field of Classification Search
USPC ........................................................ 264/682
See application file for complete search history.

(56) References Cited

U.S. PATENT DOCUMENTS

| | | | | |
|---|---|---|---|---|
| 9,944,021 | B2* | 4/2018 | Easter ................... | C04B 35/634 |
| 9,994,487 | B2* | 6/2018 | Ide ....................... | B29C 64/153 |
| 2002/0058107 | A1* | 5/2002 | Fareed ................... | B32B 18/00 427/255.39 |
| 2007/0032370 | A1* | 2/2007 | Weisensel ............. | C04B 35/573 501/88 |
| 2013/0129598 | A1* | 5/2013 | Han ...................... | C04B 35/573 423/345 |
| 2013/0327265 | A1 | 12/2013 | Inoue et al. | |

FOREIGN PATENT DOCUMENTS

| | | | | |
|---|---|---|---|---|
| GB | 1509497 | * | 9/1976 | ............. C01B 31/36 |
| JP | 2009173501 A | | 8/2009 | |
| JP | 2010207845 A | | 9/2010 | |
| WO | WO-8500363 A1 | * | 1/1985 | ........... C04B 35/571 |
| WO | 9210343 A1 | | 6/1992 | |

OTHER PUBLICATIONS

CN-102528034, Xiaoshu, Machine Translation of from STIC, Apr. 16, 2019. (Year: 2012).*
Video, 3DSystems Selective Laser Sintering Process, Jun. 23, 2013, See Video Time Stamp, URL:https://web.archive.org/web/20131028083909/http://www.youtube.com/watch?v=6s09pfILV8Y (Year: 2013).*
CN-102528034, Xu Xiaowei, Machine Translation of from STIC, Apr. 16, 2019 (Year: 2012).*
WO-85/00,363 (Hiroshi Onda) Jul. 1983 (online machine translation), [Retrieved on Sep. 30, 2019]. Retrieved from: Espacenet (Year: 1983).*
Wikipedia's Article on Silicon Carbide https://web.archive.org/web/20150325033342/https://en.wikipedia.org/wiki/Silicon_carbide. Accessed Feb. 6, 2020 (Year: 2015).*
Wikipedia's Article on Silicon Polymorphs https://web.archive.org/web/20141124050609/http://en.wikipedia.org:80/wiki/Polymorphs_of_silicon_carbide, Accessed Feb. 6, 2020 (Year: 2014).*
Antonietti, Markus, et al. "Carbon Aerogels and Monoliths: Control of Porosity and Nanoarchitecture via Sol-Gel Routes." Chemistry of Materials, vol. 26, No. 1, 2013, pp. 196-210., doi:10.1021/cm402239e. (Year: 2013).*
Rahman, et al. "Synthesis of Silica Nanoparticles by Sol-Gel: Size-Dependent Properties, Surface Modification, and Applications in Silica-Polymer Nanocomposites—A Review." Journal of Nanomaterials, Hindawi, May 10, 2012, www.hindawi.com/journals/jnm/2012/132424/. (Year: 2012).*
EP-0294850 (Pollack) Jun. 1987 (online machine translation), [Retrieved on May 19, 2020]. Retrieved from: Espacenet (Year: 1987).*
Mulay, V N. "Effect of Infiitrants on the Electrical Resistivity of Reaction-Sintered Silicon Carbide ." Springer, Bull. Mater. Sci, vol. 12, No. 2, Jul. 1989, pp. 95-99, 1989, link.springer.com/content/pdf/10.1007/BF02744505.pdf. (Year: 1989).*
Forsberg, U. "Nitrogen Doping of Epitaxial Silicon Carbide." Journal of Crystal Growth, 2001, pp. 101-102., doi:10.15417/1881. (Year: 2001).*
Kevin Jakubenas et al; "Silicon Carbide from Laser Pyrolysis of Polycarbosilane"; Journal of the American Ceramic Society; dated Aug. 1, 1995; pp. 2263-2266.
B. Y. Stevinson et al; "Support-Free Infiltration of Selective Laser Sintered (SLS) Silicon Carbide Preforms"; dated Aug. 14, 2006; pp. 359-365.
Betina Friedel et al; "Alternative Routes to Porous Silicon Carbide"; MRS Online Proceedings Library; dated Jan. 1, 2008; 8 pages.
Matthew Mott et al; "Solid Freeforming of Silicon Carbide by Inkjet Printing Using a Polymeric Precursor"; Journal of the American Ceramic Society; dated Feb. 2, 2001; pp. 307-313.
International Search Report for PCT/EP2016/057000 dated Jun. 20, 2016, 3 pages.
English Translation of the International Search Report for PCT/EP2016/057000 dated Jun. 20, 2016, 2 pages.
International Preliminary Report on Patentability for International Application No. PCT/EP2016/057000; dated Oct. 3, 2017; 6 pages.

* cited by examiner

PROCESS FOR PRODUCING A SILICON CARBIDE-CONTAINING BODY

The present disclosure relates to a method for producing a silicon carbide-containing body.

Bodies, such as components or parts thereof, are often subjected to high thermal, mechanical or chemical influences. Such bodies should therefore be formed of stable and reliable materials. In this case, such bodies may have a shape which is easy to manufacture or may have dimensions or a geometry which put high requirements on the manufacture of the body. A manufacturing method which allows a combination of the aforementioned properties of a body is often difficult to carry out and/or cost-intensive.

From document US 2013/0327265 A1, for example, a method for producing a silicon carbide crystal is disclosed. In such a method, a mixture of carbon particles and silicon particles is generated. The mixture is then heated to a temperature of at least 2000° C., so as to obtain silicon carbide. The silicon carbide is pulverized and by sublimation and recrystallization silicon carbide of type 6H is obtained.

The document JP 2010207845 A further describes a method for processing a substrate made of a silicon carbide single crystal. Here, it is described that onto such a single crystal a silicon-based powder is applied and laser radiation is irradiated on the coated area in order to produce a groove.

From document JP 2009173501 A, moreover, a method for producing a silicon carbide single crystal and a silicon carbide powder is disclosed. For this purpose, a silicon source and a carbon source are used as starting substances and subjected to a temperature treatment at 2100° C. to 2500° C.

However, there is still further room for improvement in the production of silicon carbide-containing bodies. In particular, there is further potential for improvement in terms of the ease and cost-efficiency of the manufacturing process of even small and complex dimensions or geometries.

It is therefore one object of the present disclosure, among other objects, to provide a solution by which in a simple and cost-efficient way silicon carbide-containing bodies even with small dimensions and complex geometries can be produced.

This object is achieved according to one embodiment of the disclosure by a method for producing a silicon carbide-containing body including the features of claim 1. Preferred embodiments of the disclosure are disclosed in the dependent claims, in the description, in the figure and in the example, wherein further features described or shown in the dependent claims or in the description or in the figure or in the example individually or in any combination can be a subject matter of the disclosure, unless the contrary is clearly evident from the context.

A method for producing a silicon carbide-containing body is proposed comprising the process steps:
a) providing a mixture with a silicon source and a carbon source, wherein the silicon source and the carbon source are present together in particles of a solid granular material;
b) disposing a layer of the mixture provided in process step a) onto a carrier, wherein the layer of the mixture has a predefined thickness; and
c) locally limited treatment of the mixture disposed in process step b) at a temperature in a range of ≥1400° C. to ≤2000° C. according to a predetermined spatial pattern, wherein the predetermined spatial pattern is selected based on the spatial configuration of the body to be produced.

By means of a previously described method a body of silicon carbide with good stability properties can be particularly easily be manufactured, wherein even small dimensions and complex geometries are easily formable.

In detail, the method comprises according to process step a) initially providing a mixture of a silicon source and a carbon source, wherein the silicon source and the carbon source are present together in particles of a solid granular material.

Thus, it can in particular be preferred that each of the particles of the solid granular material comprises a carbon source and a silicon source. The silicon source and the carbon source serve to enable the production of silicon carbide by a reaction of the carbon source with the silicon source in a further process.

The silicon source and the carbon source should be advantageously chosen such that they are able to form silicon carbide under the conditions described below, in particular at the following temperatures, approximately at atmospheric pressure (1 bar), by the method described above.

In particular, the silicon source in the solid may be pure silicon or silicon dioxide, and the carbon source in the solid may be pure carbon, wherein the solid particles can be formed, for example, by a sol-gel process, as hereinafter described in detail. For example, the solid particles may consist of silicon, carbon and optionally one dopant or more dopants, as described below in detail, or may make up at least the most part such as in a range of ≥90 wt.-%.

According to process step b) the method further comprises disposing a layer of the mixture onto a carrier, wherein the mixture is present in a predefined thickness. Thus, according to this process step, the mixture provided in process step a) is disposed on a carrier or a substrate, which serves as a support onto which the mixture is subjected to a temperature treatment in process step c) as described in detail below.

The configuration of the carrier can in principle be freely chosen, insofar as it withstands the reaction conditions described below. The dimensions of the carrier and in particular its support surface should be chosen advantageously as a function of the body to be manufactured or its proportions. For example, the carrier may be configured plate-like or may have a plate-like support surface. In order to remain stable in the following reaction conditions and not to adversely affect the product to be formed, the carrier, such as at least its support surface, that is the surface contacting the mixture, may be particularly advantageously constructed of silicon carbide or of a different ceramic material. For example, the carrier may comprise a silicon carbide sheet. In this configuration, it may be advantageous that the produced silicon carbide structure adheres on the carrier since in this way the further manufacturing process such as the separation of the unreacted mixture from the body produced may be simplified. In addition, in this way it can be ensured that when applying a subsequent layer of the mixture, the treated layer remains in place. This may for example be advantageous, since it is basically possible to apply the new layer of the mixture by use of a wiping mechanism.

Moreover, the thickness of the applied layer of the mixture can also essentially be freely selected. In particular, the layer thickness can be selected depending on the grain size of the mixture and the dimensions or geometry of the body to be produced, as will be explained in detail below.

According to process step c) the method further comprises a locally limited treatment of the mixture disposed in process step b) at a temperature in a range of ≥1400° C. to ≤2000° C., in particular in a range of ≥1600° C. to ≤1700° C. according to a predetermined spatial pattern, wherein the predetermined spatial pattern is selected based on the spatial configuration of the body to be produced.

In this process step, thus, a spatially selective temperature treatment of the mixture is carried out in order to produce silicon carbide from the mixture. For this purpose, a treatment of the mixture takes place at a temperature in a range of ≥1400° C. to ≤2000° C. Such a temperature can already reliably ensure that the carbon source and the silicon source react to form silicon carbide.

In particular in that the mixture is designed such that the particles include both the silicon source and the carbon source, such a low temperature can already be sufficient to achieve the desired production of silicon carbide. In this case, in particular by the configuration of the mixture, it is enabled that due to the intimate mixture for example at the atomic level of silicon and carbon in the solid granular material in a gaseous phase, which is produced around the particles of the mixture by the temperature treatment, $Si_2C$ and $SiC_2$ may be present, resulting in easier production of silicon carbide. Thus, a silicon-carbon gas can directly be present, wherein in a way obvious to a person skilled in the art also other gas components may be present. Thus, the method can be easily and cost-effectively be carried out due to the relatively low required temperature. By means of the temperature treatment thus a conversion of the mixture or the carbon source and the silicon source into silicon carbide results.

In this case, in particular by the temperatures used it can be prevented that, as is known from the prior art, a sublimation process at high temperatures is carried out. This enables an easier process control and further the prevention of material losses by sublimation.

In the method described here, it is further provided that the temperature treatment takes place locally limited and, in particular, according to a predetermined spatial pattern, wherein said predetermined pattern is selected based on the spatial configuration of the body to be produced. In other words, the temperature treatment can be carried out such that the locations of the temperature treatment correspond to the spatial pattern of the body to be produced or reflect them.

For example, in a two-dimensional body to be produced or in a two-dimensional structure of the body with uniform thickness, thus, in a simple manner a locally selective strengthening of the mixture or the formation of a solid structure can be achieved in the range of the heat treatment by means of a locally selective formation of silicon carbide by conversion of the starting materials into silicon carbide, wherein the areas which remain unreacted by the temperature treatment are still present as a loose powder. Thus, the unreacted mixture may be removed subsequently to a process such that a solid silicon carbide structure remains which corresponds exactly to the areas of the temperature treatment and thus forms the desired body to be produced due to the use of the spatial pattern. In other words, the silicon carbide-containing body can be produced by controlling the locations of the temperature treatment.

Because a highly precise control of the temperature treatment is possible, the positions of the conversion and thus the silicon carbide formation can correspondingly be controlled very accurately. Thus, the body to be produced may have very small dimensions. Furthermore, even complex geometries are possible without any problem, since the production of the structure to be produced, as already stated, is possible only by the position of the locally limited or spatially selective heat treatment.

The roughness of the body to be produced may depend on the particle size and shape of the particles, for example rounded or disk-shaped, of the mixture. The roughness also depends on the power of the heat source and the speed at which the heat source is driven over the mixture.

In this case, a control of the position of the heat treatment may in particular be based on the electronic structure data of the product to be produced. This enables a particular easy production and also permits a particularly easy adaptation or a problem-free production even of a variety of products in small numbers. A modified product or a modified body can be provided in a simple manner by providing new electronic structure data, however, without having to make costly restructuring measures to the device.

By forming the body of silicon carbide the advantage of high robustness and resistance in extreme conditions such as with respect to a variety of chemicals and conditions, such as with respect to aggressive media, e.g. acetone, acids or bases, can be achieved. The method described here has the advantage that the body to be produced is highly resistant and may also be stable at elevated temperatures optionally also with the addition of oxygen of much more than 1000° C., such as more than 1100° C. in oxygen and 1300° C. in vacuum, or even much higher, such as more than 2000° C. Further, a body producible by this method due to its high hardness is very robust even against mechanical influences. Thus, the method described herein provides the possibility of forming a body not only with a high accuracy and also with complex geometries or dimensions but also with a high stability and durability.

For example, the silicon carbide produced may be crystalline, such as in the crystalline form 3C—SiC. In particular, by such a silicon carbide the advantageous properties with respect to the mechanical and chemical robustness may be further improved.

In particular for body or structures with fine dimensions or geometries and with the above stability properties and, in particular, for silicon carbide-containing bodies production methods known from the prior art are often very cost-intensive and time-consuming in the process control, wherein these disadvantages of the prior art may in particular be avoided by the method described herein.

In summary, the method described herein, thus, enables in a particular simple manner the production of structures of silicon carbide, wherein even smallest dimensions and complex geometries are enabled without any problems.

In an embodiment it is provided that process step c) is carried out by use of a laser. For example, Nd:YAG lasers (neodymium-doped yttrium aluminum garnet lasers), $CO_2$ lasers, fiber lasers can be used, wherein these may be operable with an output of about 100 W. In particular, by use of a laser, such as an IR laser, due to a very low adjustable width of the laser beam in the micrometer range, for example in a range of ≥1 μm to ≤10 μm, but also up to the millimeter range, for example to ≤2 mm or optionally also above, a highly accurate or highly precise temperature treatment can be carried out even in the micrometer range, so that even structures with smallest dimensions can be produced without any problems. In particular, by use of a laser in an exact and defined way only the desired area of the mixture can be subjected to a temperature treatment, wherein adjacent areas are not reacted because by use of a laser a highly accurate heat input is enabled. Moreover, by use of a laser it is possible to control highly accurate the acting temperature, so that it may be ensured that the desired temperature range is maintained and, for example, a reaction of the mixture with formation of silicon carbide is ensured, but no sublimation effects occur. Thus, it can be prevented that material of the mixture is lost by such effects. Finally, a laser control can be implemented highly accurate and the mixture can be scanned easily and highly accurately with a laser, so that the quality in particular with respect to the desired shape of the structure can be particularly advantageous maintained.

In a further embodiment it can be provided that the process steps b) and c) are repeatedly carried out successively. Thus, several times in succession, in particular at least twice in succession, initially a layer of the mixture is disposed onto the carrier and then subjected to a defined temperature treatment, wherein at each of the successively applied layers of the mixture a treatment at a temperature in a range of ≥1400° C. to ≤2000° C., in particular at a temperature in a range of ≥1600° C. to ≤1700° C., is carried out respectively according to a predetermined spatial pattern, wherein said predetermined pattern is selected based on the spatial configuration of the body to be produced. Thus, the process steps b) and c) are respectively repeated in particular as continuous process steps or as a package of the process steps b) and c), respectively. In this embodiment, thus, not only a two-dimensional structure but rather a three-dimensional structure may be achieved. Thus, in this embodiment substantially any structure or any body can be provided. For example, by use of a laser the method according to this embodiment can be implemented similar to a SLM (Selective Laser Melting) process or a 3D printing process. In other words, it has surprisingly been found that in particular in this embodiment bodies or structures with a very high accuracy and of any geometries or sizes can be produced. Thus, by producing silicon carbide structures very stable and robust bodies can be obtained in a simple and cost-effective and highly accurate manner, as explained above.

In a further embodiment it is provided that between two subsequent process steps c) the distance between the carrier and a heat source for treating the mixture at a temperature in a range of ≥1400° C. to ≤2000° C. is increased. In particular, thus, the distance between the carrier and the heat source, such as a laser, is increased between two process steps c), wherein this additional process step can be carried out prior to or after the repeated application of a mixture according to process step b). The extent of the increase of the distance may be chosen in particular based on the thickness of the applied layer. In this embodiment it can be enabled in a simple way that the temperatures and influences acting on the mixture are substantially equal at each applied layer without requiring an adjustment of the intensity or power of the heat source. Thereby, it may be enabled that a structure is produced, which in its entire extension has the same characteristics and is thus highly defined. This embodiment can for example be realized by a corresponding movable carrier or by a corresponding movable heat source, such as a corresponding movable laser. By means of the movability in a manner obvious to a person skilled in the art the distance between the carrier or mixture and the heat source should be enlarged. For example, the carrier may be configured as a movable plunger or piston in a cylinder, the cylinder may form a reactor.

It may be advantageous that the method described herein comprises a further intermediate process step. In particular, it may be provided that prior to process step b) a separation layer for at least partially separating the silicon carbide-containing body to be produced from the carrier is applied onto the carrier. Thus, it may be provided that a layer is applied onto the carrier, which is present after a completed process between the produced body and the carrier and separates the body at least partially from the carrier. Thus, on the one side optionally an easy separation of the body from the carrier can be achieved. In addition, the lower surface of the body can be formed independent of the surface of the carrier. Thereby, the requirements on the carrier are lowered.

For example, the intermediate layer may likewise be a solid granular material or the intermediate layer may be a firmly contiguous layer. In particular, the intermediate layer may be not firmly connected to the carrier or lie loose on it prior to process step b). For example, the carrier layer may be formed of a material which is stable at the temperatures used in the present method. For example, sand or carbon powders can be mentioned here.

Furthermore, it may be advantageous that as a separation layer a layer of the mixture is applied onto the carrier, wherein said separation layer is treated locally limited at a temperature in a range of ≥1400° C. to ≤2000° C. in order to form at least a connection from the carrier to the silicon-containing body to be produced. Thus, it may be provided that at least one connection, in particular a plurality of connections between the body to be produced and the carrier are formed, wherein, however, other areas of the body are separated from the carrier. In other words, it can be provided that prior to process step c) a locally limited treatment of the mixture disposed on the carrier is carried out at a temperature in a range of ≥1400° C. to ≤2000° C. in order to form at least one connection from the carrier to the silicon carbide-containing body to be produced. This at least one connection is thus also configured of silicon carbide and fixes the body to the carrier. For example, the at least one connection is configured in the form of a stilt.

The at least one connection can be easily removed from the body and the carrier subsequently to the method described herein. The production of at least one such connection may be in particular advantageous in that the roughness or flatness of the body in particular at the surface facing the carrier is not dependent on the surface of the carrier. This allows the requirements on the carrier to be lowered and the carrier can be reused several times without any difficulty and without further treatment.

In a further embodiment it may be provided that at least process step c) is at least partly carried out under an inert gas atmosphere. In this embodiment it can be in particular prevented that the silicon carbide formed is oxidized and thus, for example, silicon oxide is formed on the surface. In this way a very defined and high-quality structure can be produced. Its selective removal is not necessary due to a direct applicability. Such an additional process step can be omitted according to the present disclosure which makes the method particularly cost-efficient. In addition, especially when a protective gas is used, it can be enabled that a high purity can be combined with a good thermal conductivity and, when no doping process is carried out, with good insulating properties or, when a doping process is carried out, with a good electrical conductivity. A protective gas means a gas which does not modify the formed product or undergoes a reaction therewith. As an example of a protective gas argon can be used, and further by way of example a treatment under a protective gas means an oxygen-free and nitrogen-free treatment.

In a further embodiment it may be provided that at least one process step is carried out by use of a dopant. In this embodiment, the body produced can at least partially be doped and thus at least partially be electrically conductive. This can significantly enhance the field of application of the produced product. By means of doping, moreover, the conductivity may be adjusted in a particularly defined and adjustable manner depending on the type and amount of the dopant, so that a particularly good adaptability is provided. The entire body produced can be doped, or the body may be only partially doped, i.e. include both doped and undoped areas.

With regard to doping, it may also be provided that at least process step c) is carried out partly under a protective gas and partly under a gas comprising a gaseous dopant, or that at least process step c) is carried out partly under a gas comprising a first gaseous dopant and that at least process step c) is carried out partly under a gas comprising a second gaseous dopant, wherein even with two different dopants process step c) can be at least partly carried out with a protective gas or inert gas. In this embodiment it is possible in a particularly defined manner, to only partially dope the produced body and to embed for example electrically conductive areas into electrically not or significantly less conductive areas, or vice versa. Further, it is possible to form differently doped areas, optionally next to to non-doped areas. In this way, a functional integration of different areas in a one-piece workpiece can be realized already during the production. This is possible without additional process steps, whereby the process control may be simplified and the costs can be reduced. Moreover, the produced body is not adversely affected in its stability by such a functional integration.

In a further embodiment it is provided that the mixture provided in process step a) at least partially comprises a silicon source, a carbon source and a dopant, wherein the silicon source and the carbon source and the dopant together are present in particles of a solid granular material. With respect to the dopant, it can be selected based on the desired doping type. The one or more dopants may be added here basically in a freely selectable form such as a soluble compound in a production process of the solid granular material or added elementary, for example metallic. Thus, the dopant may also be part of the solid granular material according to process step a). In this embodiment, a doping process can be implemented according to process technology very easily and further the amount of the dopant can be set very precisely.

Further, this embodiment enables that the mixture provided in process step a) is partially configured such that the silicon source and the carbon source are present together in particles of a solid granular material and the particles comprise no dopant, and that the mixture is further partially configured such that the silicon source and the carbon source are present together with a dopant in particles of the solid granular material. Furthermore, it may be provided that the mixture is partially configured such that the silicon source and the carbon source are present together with a first dopant in particles of the solid granular material and that the mixture is further partially configured such that the silicon source and the carbon source are present together with a second dopant in particles of the solid granular material. Herein, further a part of the mixture may be present which includes no dopant. Even in this embodiment one advantage of a functional integration of doped and non-doped areas or of differently doped areas optionally in addition to non-doped areas can be realized in a structure or in a body already during the production, which enables the aforementioned advantages. In this case, the arrangement of the mixture or of the particles with or without dopant or with different dopants is enabled according to the predetermined spatial pattern, so that in a simple way a predetermined arrangement of doped and non-doped areas is enabled by a corresponding arrangement of the mixture.

With respect to possible, however in no way limiting dopants, for an n-type doping preferably phosphorus (P) or nitrogen (N) can be used, or for a p-type doping boron (B) or aluminum (Al) can be used. By means of the doping a particularly good electrical conductivity of the silicon carbide or the body can be achieved.

For example, inasfar the dopant is not present in the solid granular material comprising the carbon source and the silicon source, the dopant can be supplied e.g. as a gas into a reactor in which at least process step c) is carried out. This may be particularly advantageous if the dopant can be present as a gas, wherein the dopant is incorporated into the structure during the growth of the silicon carbide. For example, in this case gaseous nitrogen can serve as a dopant.

It may be particularly advantageous in providing the dopant in the particles of the mixture according to process step a), when the dopants are introduced in the wet-chemical part of a sol-gel synthesis hereinafter described in detail, whereby the dopants can be incorporated into the growing silicon carbide during the thermal treatment. Here, the dopants can either be added as a soluble compound or as a metal. Alternatively, as described above, however, it is also conceivable that the doping of the silicon carbide being formed is performed during the thermal treatment via the gas phase. As dopants again preferably phosphorus (P) or nitrogen (N) and boron (B) or aluminum (Al), respectively, may be used.

An n-type doping may be carried out e.g. with nitrogen (exemplary additives: nitric acid, ammonium chloride, potassium nitrate or melamine), or phosphorus (exemplary additives: potassium dihydrogen phosphate or disodium hydrogen phosphate). A p-type doping can exemplarily be carried out with boron (exemplary additives: di-sodium tetraborate) or with aluminum (additive: aluminum powder). The dopants can, as is discussed below, be added to the sol, wherein the amounts are dependent on the specific additive and the desired dopant concentration.

In both methods, the diffusion of the dopants into adjacent areas is practically not possible because of the low diffusion properties in silicon carbide. The areas of different doping or doped and undoped areas thus remain sharply separated.

In a further embodiment of the method described above it may be provided that the mixture provided in process step a) is provided by use of a sol-gel process. A sol-gel process in a per se known manner means a process in which the starting materials of the compound to be produced, the so-called precursors, are present in a solvent, wherein this mixture is called sol. During the process a so-called gel is formed by in particular thermal drying or aging, from which by further processing, in particular a temperature treatment, a solid can be produced. This solid can thus be defined by the selection of precursors and includes the carbon source and the silicon source for the silicon carbide formation and may further optionally comprise a dopant for doping the silicon carbide which can already be added during the preparation of the sol.

The sol-gel process, too, can completely or at least partly be carried out in a protective atmosphere, such as in particular in an argon atmosphere.

In particular with reference to an embodiment of the above-described method, by a sol-gel process it may be provided that the sol-gel process includes at least the following process steps:

d) providing a precursor mixture comprising a silicon precursor, a carbon precursor and optionally a dopant, wherein the precursor mixture is present in a solvent;

e) treating the precursor mixture at an elevated temperature in particular with respect to room temperature (22° C.) under drying the precursor mixture; and f) optionally heating the dried precursor mixture to a temperature in a range from ≥800° C. to ≤1200° C., in particular in a range from ≥900° C. to ≤1100° C.

According to process step d) thus initially the precursors can be provided, which are processed into a solid and can then be used as a carbon source or as a silicon source, which are provided or used in process step a). The choice of the silicon source or the carbon source or the silicon precursor and the carbon precursor is thus in principle not limited. Preferred silicon precursors may include, for example, silicates, such as tetraethylorthosilicate (TEOS), whereas preferred carbon precursors may include sugars such as sucrose, to form the solid particles which are provided or used as a carbon source and a silicon source in process step a). For example, a mixture of liquid sugar and tetraethylorthosilicate, dissolved in ethanol, may be provided as a mixture of a carbon precursor and a silicon precursor in process step d), wherein the disclosure, as can be easily understood, is not limited to the aforementioned examples.

This, according to process step e), may be gelatized or aged under exclusion of air for example in a temperature range near the boiling point of the solvent, with the use of ethanol, e.g. approximately in a range of 60-70° C., and may further be dried at a temperature above the boiling point. Here, it may be advantageous if during the drying of the solid particles are formed which have a maximum diameter in a range of approximately ≥1 μm to ≤2 mm. The aforementioned size range may have in particular advantages with respect to process technology and advantages with respect to the fineness of the structures to be produced. Such a particle size may for example be enabled by a stirring process during drying, wherein the particle size may be adjustable by the stirrer used, a rotational speed and the duration or intensity of the stirring process, as is basically known to a person skilled in the art. Thus, the method in the embodiment described herein for example may offer the advantage that the mixture down to the micrometer range can essentially use any adjustable particle sizes, which can bring about significant advantages with respect to the accuracy of the body to be produced and the process control.

According to process step f) subsequently optionally a heating process of the dried precursor mixture to a temperature in a range from ≥800° C. to ≤1200° C., in particular in a range from ≥900° C. to ≤1100° C., for example 1000° C., is carried out. By means of this process step the solid produced can be in particular freed from impurities, which can make the produced silicon carbide particularly pure. Thereby the quality of the produced silicon carbide or of a produced body may be particularly high and further be adjustable in a defined way.

By means of process step e) or optionally f) the mixture according to process step a) is provided or finished, wherein particles may be produced by means of the above-described sol-gel process, each containing a silicon source, such as pure silicon or silicon dioxide, and a carbon source, such as pure carbon. In the case of addition of a dopant during the sol-gel process, this can also be present in the particles, as is described in detail below. Thus, by means of the sol-gel process a mixture can be produced on a quasi atomic level, which significantly facilitates the production of silicon carbide and in particular permits reduced temperatures in the reaction of the mixture in process step c).

In this embodiment, it may also be advantageous that the used mixture or its particles are black, which enables a good absorption of heat, such as the laser radiation, and thus further increases or advantageously influences the effectiveness of the method.

In summary, therefore, in one embodiment a sol-gel process may be applied, in which the materials to be processed together form a mixture in the form of a gel and then are dried, and in a further process step in a carbothermal reduction the formation, for example, crystallization, of the silicon carbide is implemented. The process known per se as sol-gel process provides an easily manageable and widely variable possibility for the production of different starting materials for the production of the body according to one embodiment of the disclosure.

In a further embodiment, it may also be provided that the mixture provided in process step a) or its particles having a particle size, which is set based on the predetermined spatial pattern. In this embodiment, thus, it can be taken into account that, in particular in the production of bodies or structures with relatively small dimensions or with a finely structured geometry, their accuracy may depend on the particle size of the mixture provided. Therefore, it may be provided that for example in coarser structures the particle size is relatively large, whereas in comparatively finer structures a smaller particle size is used. The particle size can be adjustable for example during a stirring process in process step e), as already described above.

In a further embodiment, it may also be provided that the thickness of the layer of the mixture according to process step b) is in a range of ≥1 μm is to 10 μm. In particular in this embodiment it is enabled that even finest structures can be produced, wherein this embodiment may further be well realized with respect to process technology. Moreover, it can be enabled, for example by use of a laser, that respectively only the corresponding top layer is thermally treated and a conversion to or crystallization of silicon carbide takes place. Any underlying layers, however, may remain untreated, which may be adjustable regardless of the layer thickness in particular by controlling the heat source, such as the laser, for example by controlling the travel speed and the power of the heat source. In addition, the absorption behaviour of the respective mixture can be determined and also be taken into account in the control of the heat source. Here, it may be likewise useful that the formed silicon carbide of a deeper layer, in contrast to the starting materials, is stable up to very high temperatures and here no more conversion can take place. This enables the production of a highly accurate and highly defined structure.

Hereinafter, the disclosure is explained by way of example with reference to figures and a preferred embodiment, wherein the features described below can be an aspect of the disclosure both individually and in combination, and wherein the disclosure is not limited to the following example.

Figure 2:
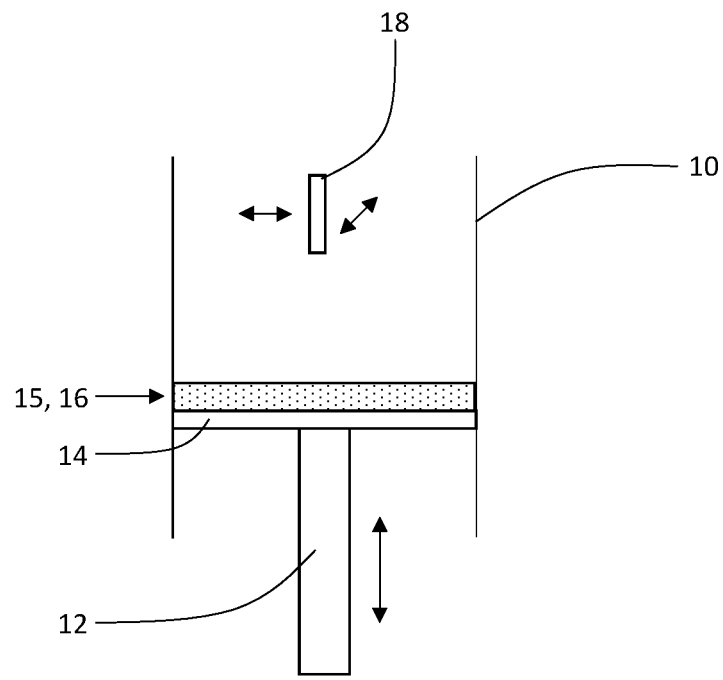
Figure 3:
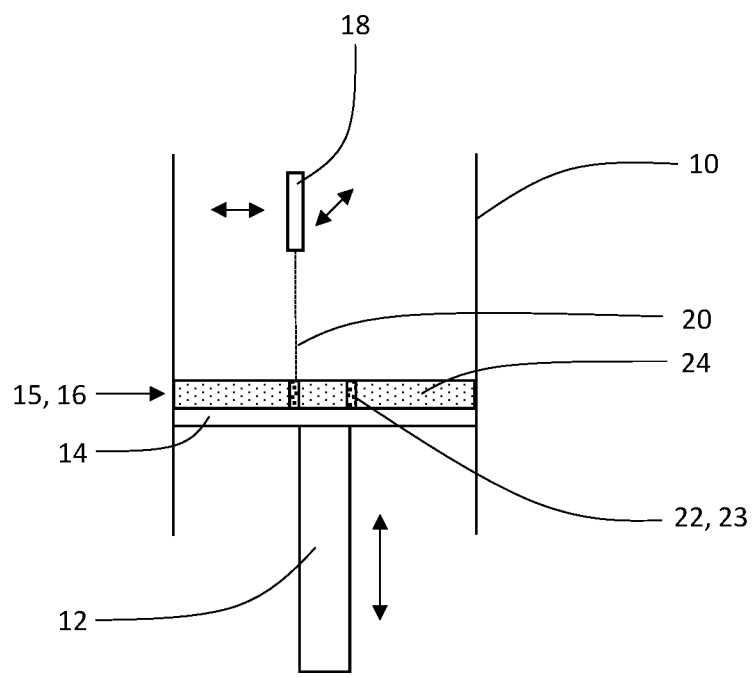
Figure 4:
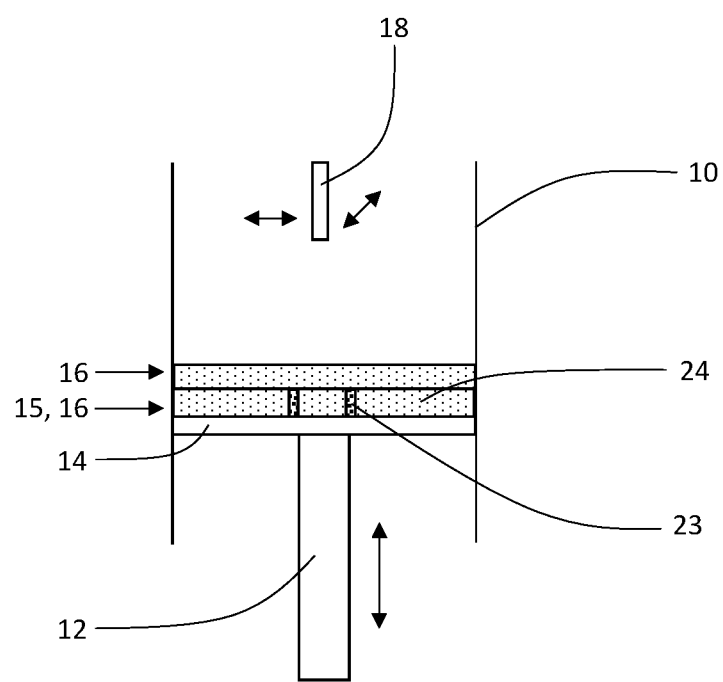
Figure 5:
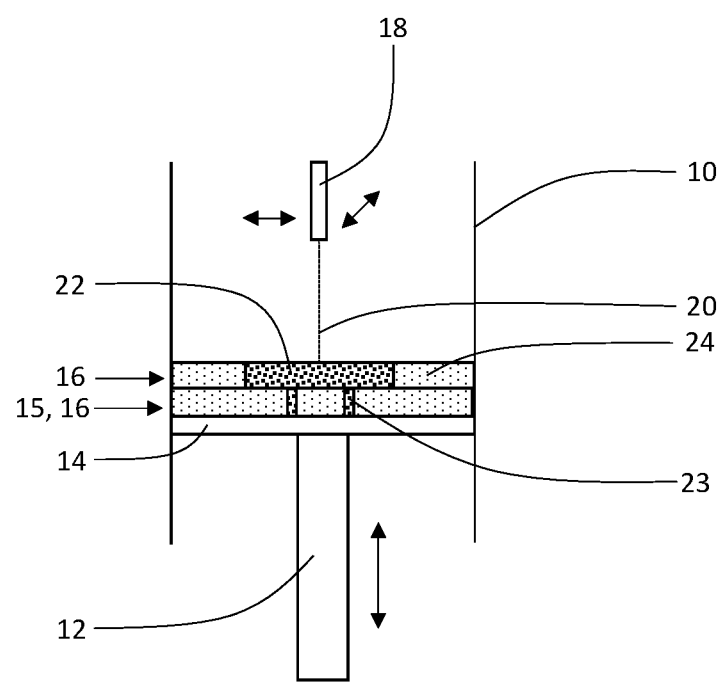
Figure 6:
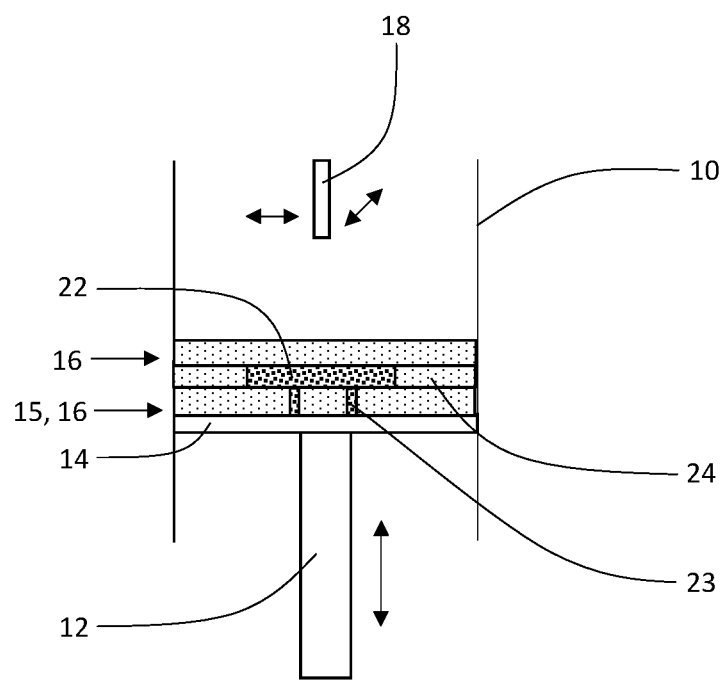
Figure 7:
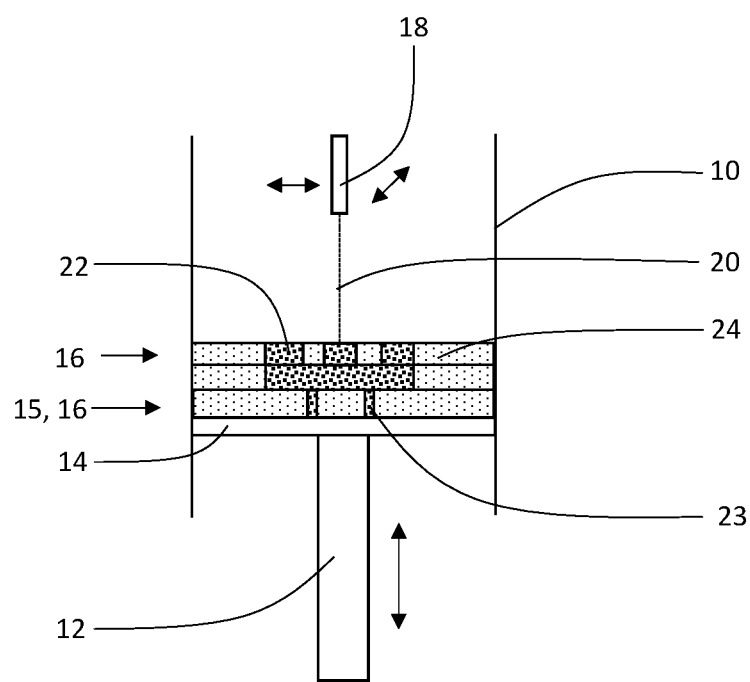
Figure 8:
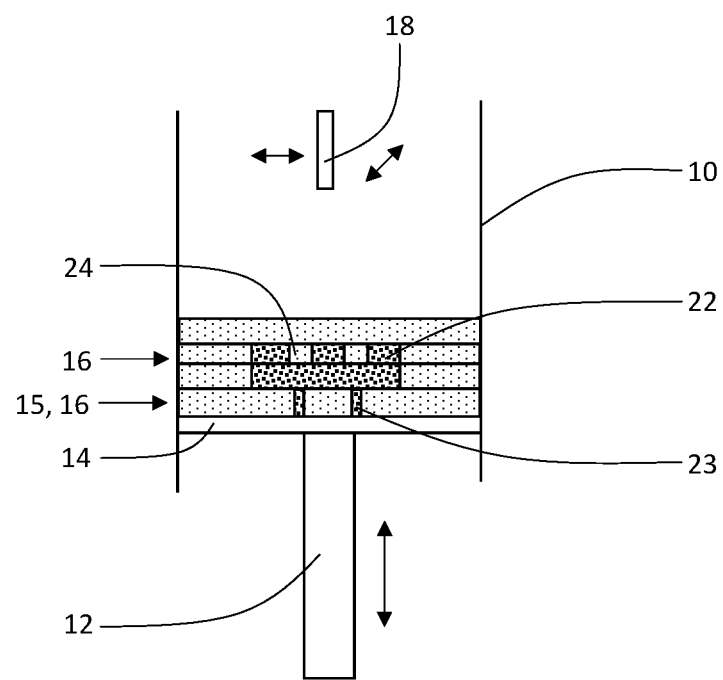
Figure 9:
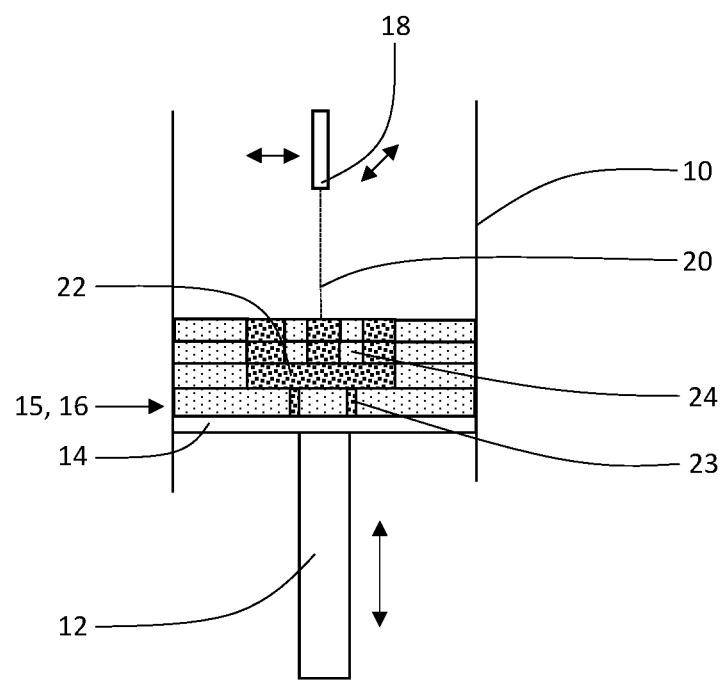

It shows:

FIG. 1 a schematic illustration of a silicon carbide-containing body which is producible by a method according to the present disclosure;

FIG. 2 a schematic illustration of a first process step of a method according to the present disclosure;

FIG. 3 a schematic illustration of another process step of a method according to the present disclosure;

FIG. 4 a schematic illustration of another process step of a method according to the present disclosure;

FIG. 5 a schematic illustration of another process step of a method according to the present disclosure;

FIG. 6 a schematic illustration of a first process step of a method according to the present disclosure;

FIG. 7 a schematic illustration of a first process step of a method according to the present disclosure;

FIG. 8 a schematic illustration of a first process step of a method according to the present disclosure; and FIG. 9 a schematic illustration of a first process step of a method according to the present disclosure.

FIG. 1 shows a schematic illustration of a silicon carbide-containing body 100, which is producible by a method according to the present disclosure. For example, the body 100 consists of silicon carbide. The body 100 can basically have substantially any shape and geometry and due to its design of silicon carbide is extremely robust against chemical and/or mechanical and/or thermal influences. For example, the body 100 may be configured of crystalline silicon carbide and thereby be present for example in the form 3C—SiC.

FIG. 2 schematically shows a first step of a method according to the present disclosure for producing the body 100. FIG. 2 shows a reactor 10, which, for example, may be sealable gas-tight and can be filled with an inert gas, such as argon, or a dopant-containing gas, such as nitrogen. In the reactor 10 a carrier 12 is provided which comprises a carrier plate 14 which may serve as a support for a mixture 16. The mixture 16 includes a silicon source and a carbon source and optionally a dopant, wherein the silicon source and the carbon source and optionally the dopant are present together in particles of a solid granular material. Moreover, a laser 18 is provided which is able to emit laser radiation 20.

FIG. 2 shows that the mixture 16 at first forms an intermediate layer 15, which is intended to at least partially separate the body 100 to be produced from the carrier 12.

FIG. 3 shows that the laser radiation 20 can thermally treat the mixture 16 of the intermediate layer 15. In detail, it is provided that a locally limited treatment of the mixture 16 disposed in process step b) at a temperature in a range of ≥1400° C. to ≤2000° C. is carried out. By the action of the laser radiation 20 on the mixture 16, the latter is heated, wherein silicon carbide is formed from the mixture 16 in treated areas 22, whereas in untreated areas 24, i.e. in areas which are not treated by the laser beam, the mixture 16 is still present. In the embodiment shown here, the treated areas 22 occurring in FIG. 3 each form connections 23 which fix the body 100 to be produced to the carrier 12 or the carrier plate 14, respectively, wherein in the untreated areas 24 a separation between the body 100 and the carrier 12 is provided.

FIG. 4 shows that a further layer of the mixture 16 is applied onto the intermediate layer 15. For this purpose, prior to the application of the further layer of the mixture 16, or prior to the temperature treatment the carrier 12 or the carrier plate 14 may be displaced such that the distance to the laser 18 is increased, in particular by the amount of thickness of the newly deposited layer. To this end, the carrier 12 or the carrier plate 14 is in particular configured movable, as shown by the arrow. With this layer the production of the body 100 begins. To this end, as shown in FIG. 5, a locally limited treatment of the mixture 16 or the uppermost layer thereof at a temperature in a range of ≥1400° C. to ≤2000° C. according to a predetermined spatial pattern is carried out, wherein the predetermined spatial pattern is selected based on the spatial configuration of the body 100 to be produced. For this purpose, similar to the formation of the connections 23, the laser 18 may be movable two-dimensionally, in particular in a plane parallel to the orientation of the carrier plate 14 or in a plane perpendicular to the propagation direction of the laser radiation 20, as shown by the arrows.

By the action of the laser radiation 20 on the mixture 16 the mixture is heated, wherein silicon carbide is formed in the treated areas 22 from the mixture, whereas in untreated areas 24, that is, in areas which are not treated by the laser beam 20, the mixture 16 is still present.

FIG. 6 shows that after the temperature treatment of the mixture 16 a further layer is applied onto the treated layer of the mixture 16, which may also be treated locally limited by the laser 18 and depending on a body to be produced. For this purpose, prior to the application of the further layer of the mixture 16 or prior to the temperature treatment the carrier 12 or the carrier plate 14 can again be displaced such that the distance from the laser 18 is increased, in particular by the amount of thickness of the newly applied layer. To this end, the carrier 12 or the carrier plate 14 is in particular configured movable, as shown by the arrow.

By means of the further temperature treatment by use of the laser 18 or the laser radiation silicon carbide 20 can be formed locally limited in the further layer, too, as shown in FIG. 7.

FIG. 8 shows a further process step in which after the temperature treatment of the mixture a further layer is applied on the treated layer of the mixture 16, which can also be treated locally limited by the laser 18 and depending on a body to be produced. For this purpose, prior to the application of the further layer of the mixture 16 or prior to the temperature treatment the carrier 12 or the carrier plate 14 can again be displaced such that the distance to the laser 18 is increased, in particular by the amount of thickness of the newly applied layer.

By means of the further temperature treatment by the laser 18 or the laser radiation silicon carbide 20 can be formed locally limited in the further layer, too, as shown in FIG. 9.

By means of a substantially arbitrary structure of the individual layers of the mixture 16 the silicon carbide-containing body 100 can be formed, which may correspond to the treated areas 22 in FIG. 6. The untreated areas 24 essentially comprise only the untreated mixture 16, which can be easily removed from the body 100. In this way, the body 100 can be finished in a simple manner by further removing the connections 23.

An exemplary method for producing such a body 100 is described in the following embodiment.

EMBODIMENT

The example described below relates to the production of a silicon carbide-containing body 100 by use of a sol-gel process for forming the starting mixture 16.

Preparation of the sol-gel Si—C precursor: In the following the chemical composition, the sol-gel treatment with various drying process steps at 70° C. to 200° C., and the final production of the Si—C solid granular material at 1000° C. are described.

Liquid sugar, tetraethylorthosilicate and ethanol are mixed to form a sol and gelatinized at 60-70° C. under airtight conditions. The composition for one batch was (a) a colloidal suspension of 135 g tetraethylorthosilicate (TEOS) in 168.7 g ethanol dissolved as a silicon source and (b) a solution of 68 g sucrose as a carbon source, in 75 g distilled water, to which 37.15 g hydrochloric acid (HCl) is added as a catalyst for forming invert sugar. Then, the solution (a) was mixed with the liquid sugar (b) under stirring. Alternatively, instead of the solution (b) liquid sugar (invert sugar, 122 g 70%) can also be used directly. Then no water and only a very small amount of hydrochloric acid (5.2 g) are added, since this is only required for the start of gelling process. This sol is aged at 50° C. and then dried at 150-200° C.

In order to obtain relatively coarser granules in the range of some 10 μm or below a temporary stirring process is carried out during the aging and/or the drying process. This granular material or powder is freed of remaining unwanted reaction products at 1000° C. in a nitrogen or argon gas stream, and finally optionally ground.

A modification of the SiC precursor for the purpose of doping of SiC nanofibers can be implemented. An n-type doping may be carried out e.g. with nitrogen (exemplary additives: nitric acid, ammonium chloride, potassium nitrate or melamine), or with phosphorus (exemplary additives: potassium dihydrogen phosphate or disodium hydrogen phosphate). A p-type doping can be carried out e.g. with boron (exemplary additive: di-sodium tetraborate) or with aluminum (additive: aluminum powder). The dopants are added to the sol, the amounts are dependent upon the specific additive and the desired dopant concentration.

The mixture thus produced can be converted to silicon carbide by a heat treatment at a temperature in a range from ≥1400° C. to ≤2000° C., whereby a silicon carbide-containing body can be formed. In detail, an n-doped mixture with a grain size of 2 mm can be heated by the beam of a fiber laser pumped by high-performance laser diodes, in a volume of about 8 mm$^3$ to a temperature of about 1600 to 1700° C. for about 0.2 seconds. The previously black mixture powder becomes solid green 3C—SiC.

The invention claimed is:

1. Method for producing a silicon carbide-containing body, the method comprising:
   a) providing a mixture with a silicon source and a carbon source, wherein the silicon source and the carbon source are present together in particles of a solid granular material;
   b) disposing a layer of the mixture provided in process step a) on a carrier, wherein the layer of the mixture has a predefined thickness; and
   c) using a laser, treating the mixture disposed in process step b) in a locally limited area and at a temperature in a range from ≥1400° C. to ≤2000° C. according to a predetermined spatial pattern, wherein the carbon source and the silicon source in the treated area react to form silicon carbide, and in the untreated areas of the mixture the carbon source and the silicon source remain unreacted and present as particles of the granular material, and wherein the predetermined spatial pattern is selected based on the spatial configuration of the body to be produced.

2. Method according to claim 1, wherein process steps b) and c) are repeatedly carried out in succession.

3. Method according to claim 2, wherein between two successive processing steps c) the distance between the carrier and a heat source for treating the mixture with a temperature in a range from ≥1400° C. to ≤2000° C. is increased.

4. Method according to claim 1, wherein prior to process step b) a separation layer for at least partially separating the silicon carbide-containing body to be produced from the carrier is applied onto the carrier.

5. Method according to claim 4, wherein as a separation layer a layer of the mixture is applied onto the carrier, wherein said separation layer is treated in a locally limited area and at a temperature in a range from ≥1400° C. to ≤2000° C. in order to form at least one connection from the carrier to the silicon carbide-containing body to be produced.

6. Method according to claim 1, wherein at least process step c) is at least partly carried out under a protective gas.

7. Method according to claim 1, wherein at least one process step is carried out by use of a dopant.

8. Method according to claim 7, wherein at least process step c) is carried out partly under a protective gas and partly under a gas comprising a gaseous dopant, or at least process step c) is carried out partly under a gas comprising a first gaseous dopant and partly under a gas comprising a second gaseous dopant.

9. Method according to claim 7, wherein the silicon carbide-containing body contains doped and non-doped areas.

10. Method according to claim 1, wherein the mixture provided in process step a) at least partially comprises a silicon source, a carbon source and a dopant, wherein the silicon source and the carbon source and the dopant are together present in particles of a solid granular material.

11. Method of claim 10, wherein the mixture provided in process step a) is partially configured such that the silicon source and the carbon source are present together in particles of a solid granular material, and that the particles comprise no dopant, and that the mixture is further partially configured such that the silicon source and the carbon source are present together with a dopant in particles of solid granular material or that the mixture is partially configured such that the silicon source and the carbon source are present together with a first dopant in particles of the solid granular material and that the mixture is further partially configured such that the silicon source and the carbon source are present together with a second dopant in particles of the solid granular material.

12. Method according to claim 1, wherein the mixture provided in process step a) is provided by use of a sol-gel process.

13. Method according to claim 12, wherein the sol-gel process comprises at least the following process steps:
   d) providing a precursor mixture comprising a silicon precursor, a carbon precursor and a dopant, wherein the precursor mixture is present in a solvent;
   e) treating the precursor mixture at an elevated temperature to dry the precursor mixture; and
   f) heating the dried precursor mixture to a temperature in a range from ≥800° C. to ≤1200° C.

14. Method according to claim 1, wherein the mixture provided in process step a) comprises particles of the solid granular material with a particle size which is set based on the predetermined spatial pattern.

15. Method according to claim 1, wherein the thickness of the layer of the mixture is in a range from ≥1 μm to ≤10 μm.

16. Method according to claim 1, wherein silicon and carbon make up ≥90 wt.-% of the particles of the solid granular material.

17. Method according to claim 1, wherein the silicon carbide formed in process step c) comprises crystalline silicon carbide in the form 3C—SiC.

18. Method according to claim 1, wherein the silicon source is pure silicon or silicon dioxide, and the carbon source is pure carbon.

* * * * *